(12) United States Patent
Mielonen

(10) Patent No.: US 7,731,011 B2
(45) Date of Patent: Jun. 8, 2010

(54) METHOD AND APPARATUS FOR TURNING PAPER ROLLS

(75) Inventor: Eero Mielonen, Lahti (FI)

(73) Assignee: Metso Paper, Inc., Helsinki (FI)

( * ) Notice: Subject to any disclaimer, the term of this patent is extended or adjusted under 35 U.S.C. 154(b) by 65 days.

(21) Appl. No.: 11/991,923

(22) PCT Filed: Sep. 11, 2006

(86) PCT No.: PCT/FI2006/000302

§ 371 (c)(1),
(2), (4) Date: Jun. 30, 2008

(87) PCT Pub. No.: WO2007/031595

PCT Pub. Date: Mar. 22, 2007

(65) Prior Publication Data

US 2009/0038912 A1    Feb. 12, 2009

(30) Foreign Application Priority Data

Sep. 12, 2005   (FI)   ................................... 20050908

(51) Int. Cl.
*B65G 47/80* (2006.01)
*B65H 19/12* (2006.01)

(52) U.S. Cl. ...................... 198/412; 198/406; 198/410; 198/413; 198/414

(58) Field of Classification Search ................ 198/406, 198/410, 412, 413, 414, 597, 607, 809
See application file for complete search history.

(56) References Cited

U.S. PATENT DOCUMENTS

| | | | |
|---|---|---|---|
| 2,559,319 A | | 2/1946 | Robson |
| 4,219,113 A | * | 8/1980 | Fieser et al. ................ 198/414 |
| 4,522,292 A | * | 6/1985 | Euverard et al. ............ 198/374 |
| 4,553,893 A | * | 11/1985 | Kaschner et al. ............ 414/152 |
| 4,712,283 A | * | 12/1987 | Bertorello ................... 29/33 P |
| 5,009,306 A | * | 4/1991 | Roderick et al. ............ 198/414 |
| 5,127,336 A | * | 7/1992 | Wakabayashi ............... 104/35 |
| 5,141,095 A | * | 8/1992 | Kamp ......................... 198/409 |

(Continued)

FOREIGN PATENT DOCUMENTS

DE      24 25 452       4/1975

(Continued)

OTHER PUBLICATIONS

Search Report issued for the corresponding Finnish application (FI20050908).

(Continued)

*Primary Examiner*—Douglas A Hess
(74) *Attorney, Agent, or Firm*—Cohen Pontani Lieberman & Pavane LLP

(57) ABSTRACT

Method and arrangement for changing the direction of travel of a reel being moved by a incoming conveyor (12), for transfer to the following conveyor, in which method the reel is first brought to a turntable and the direction of travel of the reel is changed by turning the turntable. After turning, the reel is removed to a receiving conveyor. In order for the turntable to be able to turn reels, the width of which is greater than the diameter of the turntable, the reel is lifted on the turntable from the level of the incoming and receiving conveyors, for the duration of the turning.

9 Claims, 3 Drawing Sheets

U.S. PATENT DOCUMENTS

| | | | | |
|---|---|---|---|---|
| 5,143,198 | A | * | 9/1992 | Hale et al. .................. 198/414 |
| 5,246,096 | A | * | 9/1993 | Terpstra .................... 198/371.3 |
| 5,445,493 | A | * | 8/1995 | Yourgalite et al. ....... 414/791.6 |
| 5,921,375 | A | * | 7/1999 | van Laar .................. 198/471.1 |
| 6,079,096 | A | * | 6/2000 | Hata et al. .................... 29/740 |
| 6,120,239 | A | * | 9/2000 | Roskam ................... 414/791.2 |
| 6,308,818 | B1 | * | 10/2001 | Bonora et al. ............ 198/465.1 |
| 6,332,530 | B1 | * | 12/2001 | Grossmann et al. ...... 198/468.8 |
| 6,354,431 | B1 | * | 3/2002 | DeCecca et al. ............ 198/775 |
| 6,494,304 | B1 | * | 12/2002 | Jaynes et al. ............. 198/345.2 |
| 6,505,733 | B2 | * | 1/2003 | Troupos et al. ............. 198/809 |

FOREIGN PATENT DOCUMENTS

| | | |
|---|---|---|
| DE | 31 18 379 | 11/1982 |
| GB | 2 354 511 | 3/2001 |
| JP | 60-071424 | 4/1985 |
| JP | 08-319020 | 12/1996 |

OTHER PUBLICATIONS

Search Reports issued for the corresponding PCT patent application (PCT/FI2006/000302).

* cited by examiner

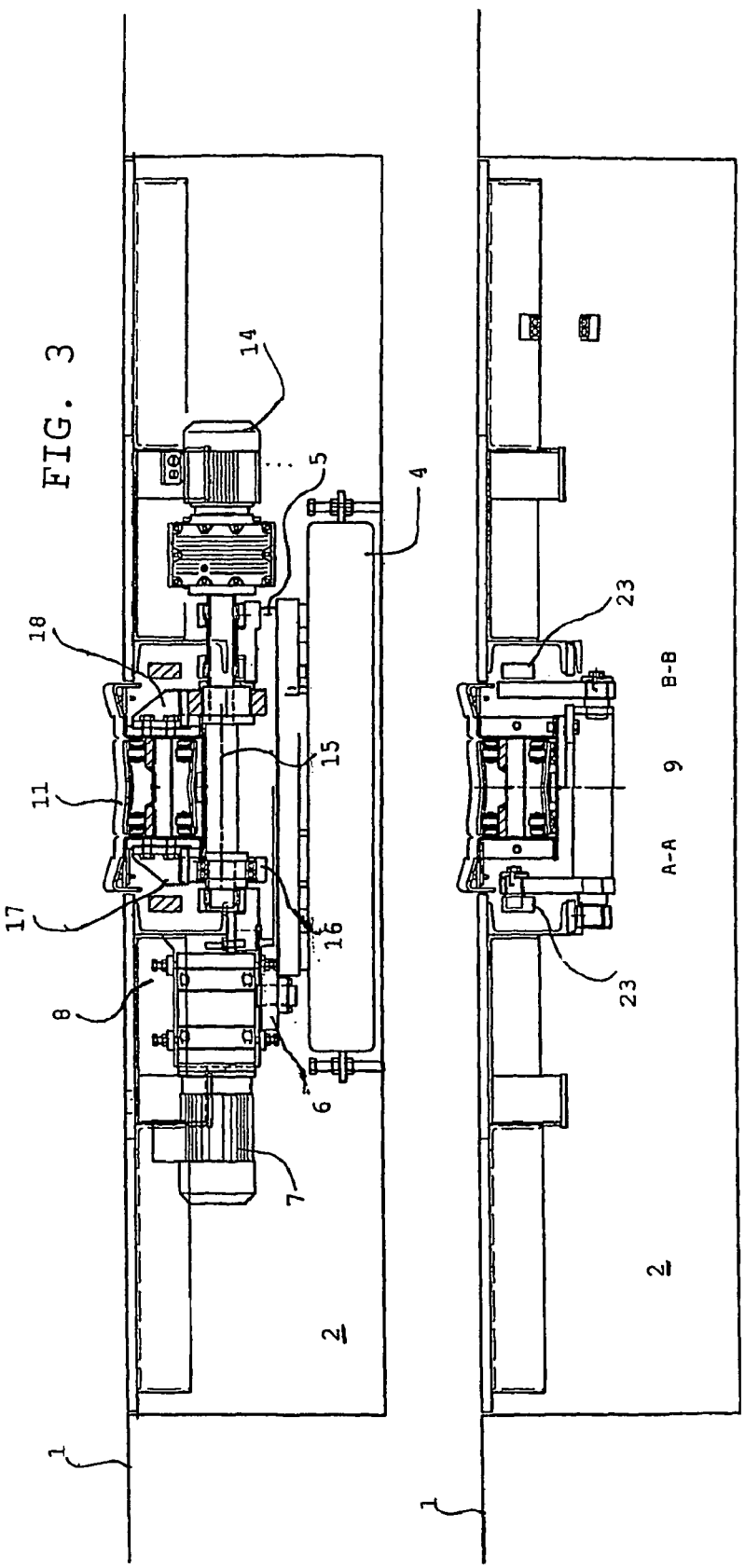

METHOD AND APPARATUS FOR TURNING PAPER ROLLS

CROSS REFERENCE TO RELATED APPLICATIONS

This is a U.S. national stage of application No. PCT/FI2006/000302, filed on Sep. 11, 2006. Priority is claimed on Finland application No. 20050908, filed Sep. 12, 2005.

BACKGROUND OF THE INVENTION

1. Field of the Invention

The present invention relates to a method for turning paper, board, tissue, and other fibre reels from their direction of travel during transfer.

2. Description of Prior Art

During the manufacture of paper, board, and corresponding fibre webs, the reels are cut after manufacture from large reeling-drum reels to the dimensions requested by customers and are then packed for transport. As a large number of different reel widths are made, the packaging machines must be able to operate in a very wide range of reel widths. During packaging and when moving the reels to intermediate storage, the reels are moved using various conveyors. The conveyors are usually straight and the direction of the reel is changed by turning it on a turning device, after which transportation continues using the next conveyor. At the turning device, intersections are formed, which can be L, T, or X-shaped, depending on whether only a change in direction is required, or whether different alternative routes are required. At a single intersection point, there can be one conveyor bringing the reels and several conveyors leaving the intersection, or several conveyors bringing the reels and only one leaving it, or several leaving and several coming to it. In practice, there are at most four conveyors joining a single intersection point.

At the intersection point, a turntable is used to turn the reels onto conveyors running in different directions. The turntable is a short conveyor, which can be rotated around its central axis on the plane of the other conveyors. The continuations of the center lines of the conveyors arriving at and leaving the intersection point usually travel through the central axis of the turntable, but it is, as such, possible for a conveyor to be at one side of the central axis of the turntable. The turntable conveyor is arranged on a bearing at its axis of rotation and can be rotated with the aid of an electric-motor drive or some other similar drive. Rotation can also take place using a crank handle. Rotation can take place to either one or other side relative to the arriving conveyor, or else the turntable can be used to make a stop before transfer to the following conveyor, or the reel can be rotated through 180°. Combinations of these can also be used.

As the widths of the reels delivered to customers increase, the sizes of the turntables also increase. This is because the reel must fit onto the turntable's conveyor, so that the reel will not be damaged during turning and can be kept under control while being handled on the turntable. The reel must fit completely onto the turntable, as otherwise the parts of the turntable outside the reel would damage the ends of the reel. On the other hand, the conveyor component of the turntable must be on the same level as the incoming and outgoing conveyors, nor must there be any differences in height between the conveyors. For these reasons, the diameter of the turntable must correspond at least to the length of the widest reel. Because customer requirements demand the handling of quite wide reels, the turntables become large and heavy. Thus they also take up much space in the mill hall.

SUMMARY OF THE INVENTION

The invention is intended to create a turntable that is smaller than previously, by means of which even wide reels can be handled.

The invention is based on making the turntable able to be lifted, allowing the reel to be raised above the level of the conveyors bringing it and removing it and to be rotated to its new direction of travel when in the raised position of the turntable.

Considerable advantages are gained with the aid of the invention.

The turntable is made with a considerably lighter construction than that in previous solutions, as the turning diameter and conveyor of the turntable can be reduced by as much as meters. Even though the construction requires a lifting mechanism, the lifting movement required is quite small and the lifting device can be reasonably priced. The vertical movement can be implemented, for instance, with the aid of an electric-motor driven scissors mechanism, a pneumatic cushion, or an opposing-wedge mechanism. As the intention is only to raise the reel enough during turning to prevent its ends from catching on the mill-hall floor or the incoming and outgoing conveyors, a lifting distance of a few centimeters will be sufficient. When the diameter of the turntable is reduced, the turning intersection can be located in a smaller space and the design of the conveyor will be facilitated.

BRIEF DESCRIPTION OF THE DRAWINGS

In the following, the invention is examined with the aid of examples and with reference to the accompanying drawings.

FIG. 3 shows a cross-section of the turntable of FIG. 1.

FIG. 4 shows a second cross-section of the turntable of FIG. 1.

DETAILED DESCRIPTION OF THE PRESENTLY PREFERRED EMBODIMENTS

Figure 1:
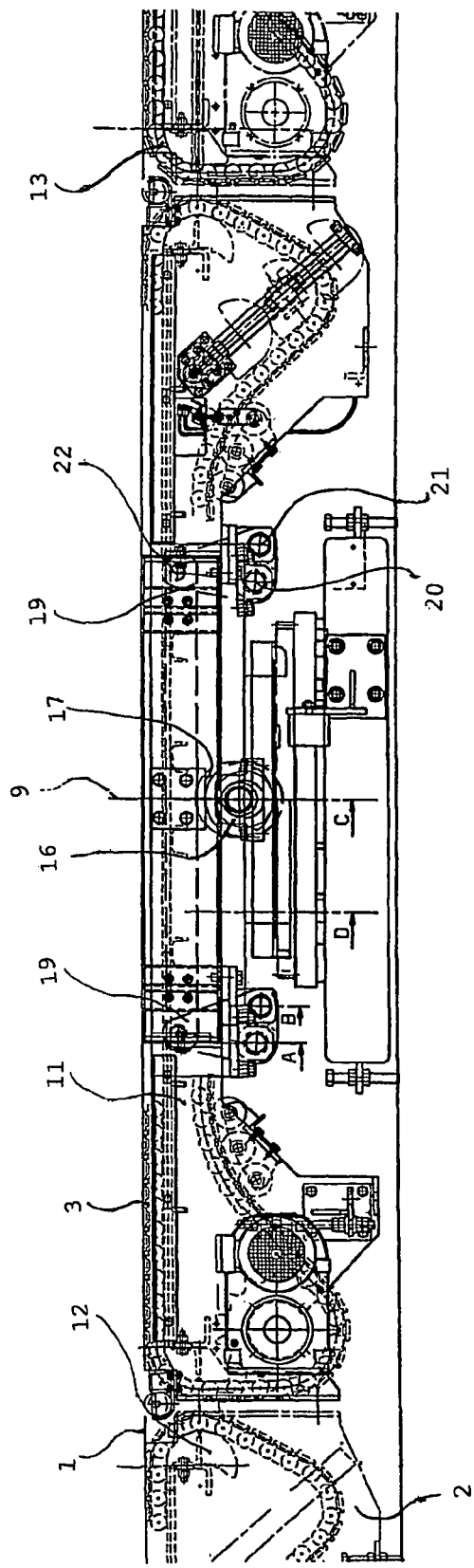
FIG. 1 shows a side view of one turntable according to the invention.
Figure 2:
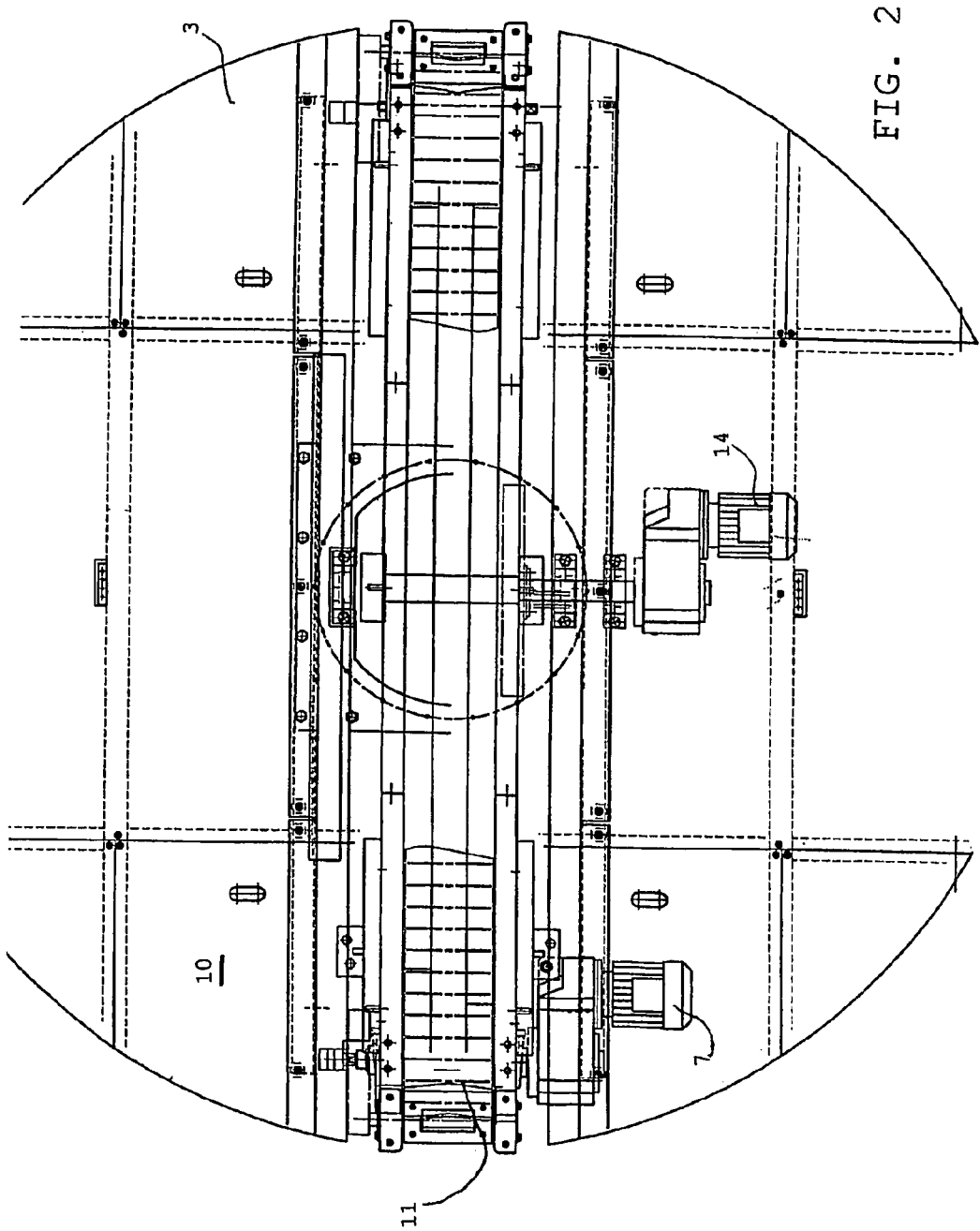
FIG. 2 shows a top view of the turntable according to FIG. 1.

In this case, the turntable is situated in a pit 2 in the floor level 1. In its lowest position, the upper surface 3 of the turntable is on the same level as the floor level. The turntable is installed on a pedestal 4 in the pit 2, with the turning mechanism of the table being directly on top of the pedestal 4. The turning mechanism comprises a toothed ring 5 permanently fitted to the pedestal 4, a toothed wheel 6 fitted to the toothed ring 5, and a geared electric motor 7 driving the toothed wheel 6. The geared motor 7 is attached to the turntable's upper frame 8, which is fitted rotatably on bearings on the pedestal 4. When the geared motor 7 of the turning mechanism is operated, the toothed wheel 6 moves along the toothing of the toothed ring 5 and the turntable's upper frame 8, along with the components attached to it, rotates around its central axis 9.

The upper surface of the turntable consists of a table level 10 and a conveyor 11. The task of the table level 10 is to cover the opening of the turntable pit 2 for safety reasons, while the conveyor 11 is used to move the reel on the turntable. The figures show a slat conveyor, but the type of conveyor does not affect the application of the invention. In the example of FIG. 1, two conveyors 12, and 13 are arranged in line with the diameter of the turntable. The conveyors 12, 13 that bring reels to, and receive them from the turntable can be arranged around the turntable at any point on its outer circumference, at the desired angles to each other. However, the conveyors 12, 13 are usually at angles of ±90° or ±180° relative to the conveyor bringing the reels. The number and alignments of the bringing and receiving conveyors are determined according to the requirements of the handling system. The conveyors can be at exactly floor level, or slightly above it.

If a reel wider than the turntable diameter is brought to the turntable, the table cannot be turned, because in that case the ends of the reel remaining outside the table would be damaged. Thus previously the diameter of the table has had to be dimensioned according to the widest reel to be handled, which naturally leads to a heavy construction and in particular demands a great loadbearing capacity in the rotating bearings. The idea of the invention is that, if the table can be lifted slightly above the level of the floor 1 and the conveyor 12, 13, the diameter of the table and the length of the conveyor 11 on it can be reduced. If the reel is lifted slightly, the turntable can be rotated without the reel ends being damaged, as they will then be able to move freely above the floor level I and the levels of the bringing and receiving conveyors 12, 13. In order to raise the turntable, there is lifting machinery in it, by means of which the turntable's conveyor 11 is raised for the duration of the rotation of the table. The lifting machinery comprises the geared motor 14 at the right-hand side of the cross-section C-C of FIG. 3, in the rotating upper frame 8 of the lifting table. An eccentric shaft 15, on which lifting wheels 16 are mounted in bearings on each side of the frame 18 of the turntable's conveyor 11, runs from the geared motor 14 of the lifting machinery. At the sides of the frame 18 of the conveyor there are support surfaces 1 i corresponding to the lifting wheels. When the geared motor 14 rotates the eccentric shaft 15, the lifting wheels 16 rise against the support surfaces 17 of the conveyor frame 18 and the conveyor 11 rises. The conveyor 11 is supported to move vertically on three-axis carrier arms 19, which comprise three pivot points 20-22. The 3-axis support arms 19 appear in FIG. 1 and in cross-sections A-A and B-B of FIG. 4. The carrier arms 19 at the drive and return ends of the turntable conveyor 11 are synchronized with each other at their upper ends by connecting levers 23, see the cross-sections. Cross-section A-A shows arm 19 mounted in bearings at its lower end to the rotating upper frame 8 by means of a fixed pivot 20, which permits rotation of the arm 19, but not movement of the pivot point. In cross-section B-B, the arm 19 is mounted in bearings at its lower end to the rising frame 18 of the turntable conveyor 11, by a pivot 21. When the conveyor rises, the pivot 20 of the arm 19 thus remains in place and the upper pivot 22 of the arm and the pivot 21 of the rising turntable conveyor's 11 frame 18 moves with the conveyor.

The mechanism described above is only one possible lifting device. Alternatively, mechanisms of a different construction can be used, such as hydraulic or pneumatic cylinders, or lifts. The electric-motor drive has the advantages that electrical operating devices and control are used elsewhere in the system, so that there is no need for several different operating-power devices. The lifting elements must, however, be such that at least the turntable conveyor can be rotated on the bearings of the turntable when the conveyor is raised from the level of the incoming and receiving conveyors.

The lifting table according to the invention is used for changing the direction of travel of paper, board, or pulp reels, at intersections of the conveyors transporting them. The intersections, at which the table is used, are of very many different kinds. There are four-way intersections, T intersections, right-angles intersections, while the reel/s can come from one direction and correspondingly leave in another direction. While the arrival and departure directions of the reels do not, as such, affect the principle of the rising turntable, how a reel can be run onto the table does affect it.

In the following, the term front end of the reel refers to its front end in its direction of travel, the term rear edge of the turntable refers to the rear edge in the direction of travel of the reel, and correspondingly the term front edge refers to the front edge in the direction of travel of the reel. The movements of the conveyors that bring reels to the table and of those that take the reels from the table must be synchronized with the operation of the reel handling points. Thus, when handling a reel on the turntable, it is important how the conveyors can be run when bringing the reel to the table and when taking it from it. If there is a conveyor that can be operated when the front end of the reel crosses the rear edge of the table, and which is opposite to the conveyor in the direction of arrival of the reel, the reel can be run directly to the center of the table, because the opposite conveyor can support and receive the end of the reel that protrudes from the table. If there is no receiving conveyor and there is insufficient difference in height between the turntable conveyor and the floor level, the front end of the reel is run to the rear edge of the turntable, after which follows lifting and turning and removal to the receiving conveyor. The receiving conveyor can be the same as the incoming conveyor, in which case the operation will be one of changing which end of the reel faces which way.

Examples of various functions are running the reel over the table, in such a way that the reel comes to the center of the table and its ends extend over both sides of the table, the first end on the conveyor at the opposite side of the table, after which follows lifting and turning, or leaving the front end of the reel on the rear edge of the table, after which follows lifting, final running to the center of the table, and turning. The rear end of the reel can be run to the front end of the table, after which lifting, running to the center, and turning are performed. Turning can also be performed without centring the reel. At least in theory there are many variations, the type of running depending, for example, on whether the turned reel can be run onto the following conveyor (if there is one). But the idea is thus to use a turntable that is shorter than the widest reel, as well as a conveyor on the turntable.

What is claimed is:
1. An apparatus for changing the direction of travel of paper, board, or other fibre reels, comprising:
   a turntable rotatable about a vertical axis of rotation, the turntable having an upper surface, a diameter of the upper surface being sufficient to cover a pit in which the turntable operates;
   a conveyor mounted on the turntable and capable of receiving a reel from a bringing conveyor bringing the reel to the turntable, moving the reel on the turntable, and feeding the reel to a receiving conveyor, the conveyor of the turntable having a length less than a greatest width of a reel;
   bearings for rotating the turntable around its axis of rotation;
   means for rotating the turntable on the bearings; and
   means for lifting the conveyor of the turntable, without also lifting the upper surface of the turntable, above a level of the bringing and receiving conveyors and for allowing the conveyor of the turntable to be rotated on the bearings while the conveyor of the turntable is in a lifted position.
2. The apparatus of claim 1, wherein a length of the conveyor of the turntable is less than a greatest width of reels brought to the turntable.

3. The apparatus of claim 1, wherein the means for lifting the turntable comprises an eccentric mechanism for lifting the turntable and an arm mechanism for controlling the lifting.

4. The apparatus of claim 1, wherein the means for rotating the turntable and the means for lifting comprise geared electric motors.

5. A method for changing a direction of travel of a reel transported by a bringing conveyor comprising:
   bringing the reel to a conveyor of a turntable the turntable having an upper surface, a diameter of the upper surface being sufficient to cover a pit in which the turntable operates;
   changing the direction of travel of the reel by rotating the turntable;
   removing the reel to a receiving conveyor; and
   raising the conveyor of the turntable bearing the reel from a level at which the reel is brought to and received by the turntable for the duration of the rotating of the turntable, the upper surface of the turntable not being raised when the conveyor of the turntable is raised.

6. The method of claim 5, further comprising lowering the reel with the turntable to the level of the receiving conveyor after the rotating the turntable and before the reel is removed from the turntable.

7. The method of claim 5, further comprising, after the reel is received on the turntable and prior to rotating the turntable, moving the reel so that the reel is centered on the turntable.

8. The method of claim 5, wherein, after the reel is received on the turntable, moving the reel on the turntable prior to rotating the turntable so that a front end of the reel is at a rear edge of the turntable.

9. The method of claim 5, wherein, after the reel is received on the turntable, moving the reel on the turntable prior to rotating the turntable so that a rear end of the reel is at a front edge of the turntable.

\* \* \* \* \*